United States Patent [19]

May et al.

[11] Patent Number: 5,273,355
[45] Date of Patent: Dec. 28, 1993

[54] AGGREGATE DRYER AND SOIL INCINERATOR

[75] Inventors: James G. May, Hixson; James G. Renegar, East Ridge, both of Tenn.

[73] Assignee: Astec Industries Inc., Chattanooga, Tenn.

[21] Appl. No.: 872,437

[22] Filed: Apr. 23, 1992

[51] Int. Cl.⁵ .................................. B28C 5/46
[52] U.S. Cl. ...................... 366/23; 110/226; 110/236; 110/246; 366/25; 432/106
[58] Field of Search .......... 366/22, 23, 24, 25, 366/26, 144, 147; 110/226, 236, 246; 432/103, 106, 119

[56] References Cited

U.S. PATENT DOCUMENTS

| | | | |
|---|---|---|---|
| 3,037,468 | 6/1962 | Snellman | 432/119 |
| 4,975,049 | 12/1990 | Roenigk | 432/119 |
| 5,090,813 | 2/1992 | Farland | 366/23 |
| 5,176,445 | 1/1993 | Mize | 366/22 |

Primary Examiner—Robert W. Jenkins
Attorney, Agent, or Firm—Nilles & Nilles

[57] ABSTRACT

An apparatus is disclosed which is adapted to heat and dry stone aggregate useful in the production of asphalt paving, and which also has the ability to incinerate contaminated soil. The apparatus comprises a rotary drum for heating and drying the stone aggregate, and a separate rotary incinerator for incinerating the soil. The incinerator includes an outlet housing for withdrawing the incinerated soil and selectively conveying the soil so as to be mixed with the heated and dried aggregate, or delivered to a separate location. Further, the incinerator has an exhaust duct for conveying the gaseous products of combustion from the incinerator into the rotary drum, so that any volatile hydrocarbons contained in the gaseous products of combustion from the incinerator are effectively incinerated before being discharged to the atmosphere.

19 Claims, 2 Drawing Sheets

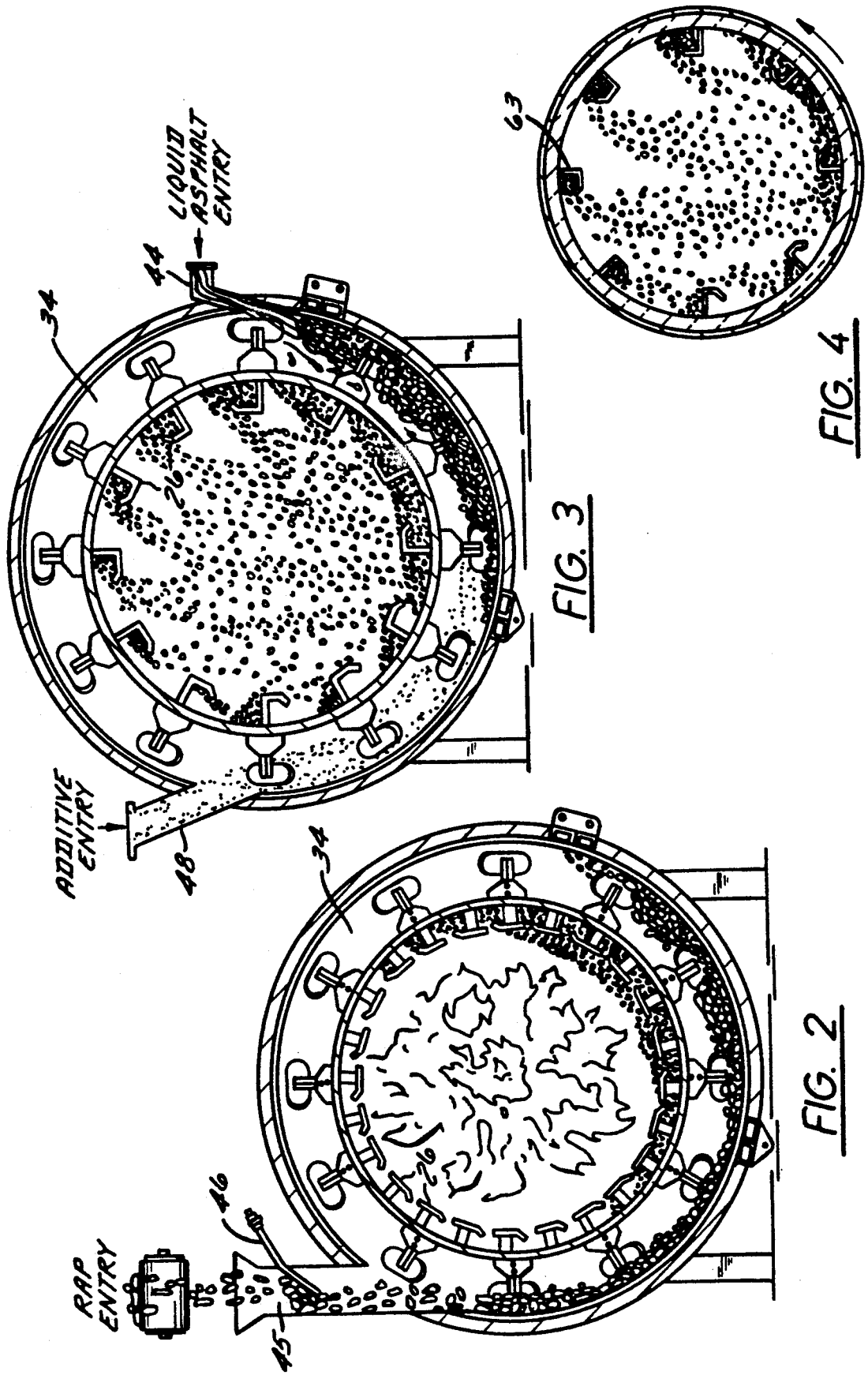

AGGREGATE DRYER AND SOIL INCINERATOR

BACKGROUND OF THE INVENTION

The present invention relates to an apparatus for continuously heating and drying stone aggregate useful in the production of asphalt paving composition or the like, and which also has the ability to incinerate contaminated soil under environmentally acceptable conditions.

The effective cleanup and disposal of soils which are contaminated with petroleum products and other contaminants have recently become major environmental concerns. As one specific example of the problem, a large number of underground fuel tanks have been found to be leaking and releasing a variety of contaminants into the surrounding soil, and as these tanks are being removed and repaired pursuant to environmental regulations, the volume of contaminated soil has been growing. Many communities no longer permit such soil to be placed in landfills, and thus a need exits for the decontamination of the soils.

Copending and commonly owned application Ser. No. 07/565,945 filed Aug. 10, 1990, discloses an apparatus for efficiently decontaminating soil, and wherein the soil is heated in the same rotary drum mixer used in the production of the asphalt. Thus the apparatus has several common components with a conventional asphalt production plant. This feature permits a conventional asphalt plant to be retrofitted by the addition of a relatively small number of additional components, so as to permit the apparatus to selectively produce asphalt, or to decontaminate soil.

Another known design for a soil decontamination apparatus which is utilized in combination with several of the components of a conventional asphalt plant, is disclosed in pending and commonly owned application Ser. No. 07/668,305, filed Mar. 13, 1991, and which comprises a drum dryer for heating aggregate in the conventional manner, and which includes a discharge end which is enclosed by a breaching for conveying the heated material to an external conveyor. A rotary soil incinerator is mounted adjacent the discharge end of the drum dryer, and the incinerator includes a discharge end which communicates with the breaching so that the incinerated soil may be discharged into the breaching and mixed with the heated aggregate. While the apparatus described in this latter application is very satisfactory, each unit must be customed designed and built, and the rotary soil incinerator cannot be standardized and used to retrofit existing dryers in view of the large number of different designs of such dryers.

Still another known soil decontamination apparatus involves a conventional aggregate dryer which is fitted with a slowly rotating combustion chamber adjacent the burner. The soil is fed into the rotating combustion chamber where it is incinerated, and the incinerated soil is then mixed with the aggregate. This apparatus is also generally satisfactory in operation, but is involves a high initial capital cost, and the operating cost is significant since the rotating combustion chamber is subject to deterioration even when soil is not being processed. Also, the incinerated soil is necessarily added to the heated aggregate whenever aggregate is being processed, and there is no opportunity for the separate use of the soil.

It is accordingly an object of the present invention to provide an aggregate dryer and soil incinerator wherein the soil incinerator is separate from the dryer and may be of standard construction so as to be adapted for use in association with dryers of different constructions.

It is another object of the present invention to provide an aggregate dryer and soil incinerator wherein the incinerator is of standard or universal design and may be used to retrofit existing dryers.

A further object of the present invention is to provide an aggregate dryer and soil incinerator wherein the incinerated soil exiting the incinerator can be selectively diverted so as to be mixed with the aggregate heated in the dryer, or separately utilized so as to not require that the soil be added to the aggregate.

It is still another object of the present invention to provide an aggregate dryer and soil incinerator wherein the volatile hydrocarbons contained in the gaseous products of combustion in the soil incinerator are further incinerated in the dryer to prevent a harmful discharge to the atmosphere.

SUMMARY OF THE PRESENT INVENTION

The above and other objects and advantages of the present invention are achieved in the embodiment illustrated herein by the provision of an apparatus which comprises a rotary drum for heating and drying stone aggregate, and a rotary incinerator for incinerating a second material, such as contaminated soil. The rotary incinerator comprises inlet means for introducing the second material into the interior of the incinerator, heating means for heating the interior of the incinerator, and outlet means for withdrawing the incinerated second material from the incinerator. The outlet means includes provision for selectively (1) conveying the incinerated material from the incinerator so as to be mixed with the heated and dried aggregate produced by the rotary drum means or (2) delivering the incinerated second material to a separate location. The rotary incinerator also includes exhaust gas means for conveying the gaseous products of combustion from the incinerator into the rotary drum means.

In a preferred embodiment, the outlet means of the rotary incinerator includes a housing communicating with the discharge end of the incinerator, and with the housing defining first and second separate passageways. A diverter gate is positioned in the housing for selectively delivering any material discharged from the incinerator into either one of the passageways. One of the passageways is positioned so as to direct the discharged material so as to be mixed with the heated aggregate which is produced by the rotary drum, and the other passageway is positioned to direct the discharged material to a stockpile or the like for separate use.

Also in the preferred embodiment, the rotary drum for heating the aggregate includes a fixedly mounted cylindrical combustion chamber adjacent one end thereof, and a burner for heating the interior of the combustion chamber as well as the interior of the drum. The exhaust duct means of the incinerator includes provision for delivering the gaseous products of combustion from the incinerator into the combustion chamber, so that any volatilized contaminants are effectively incinerated before being released to the atmosphere.

BRIEF DESCRIPTION OF THE DRAWINGS

Some of the objects and advantages of the present invention having been stated, others will appear as the description proceed, when taken in conjunction with the accompanying drawings, in which

FIG. 2 is an end sectional view taken substantially along the line 2—2 of FIG. 1 and in an enlarged scale;

FIG. 3 is an end sectional view taken substantially along the line 3—3 of FIG. 1 and in an enlarged scale; and FIG. 4 is an end sectional view taken substantially along the line 4—4 of FIG. 1 and in an enlarged scale.

DETAILED DESCRIPTION OF THE PREFERRED EMBODIMENT

Figure 1:
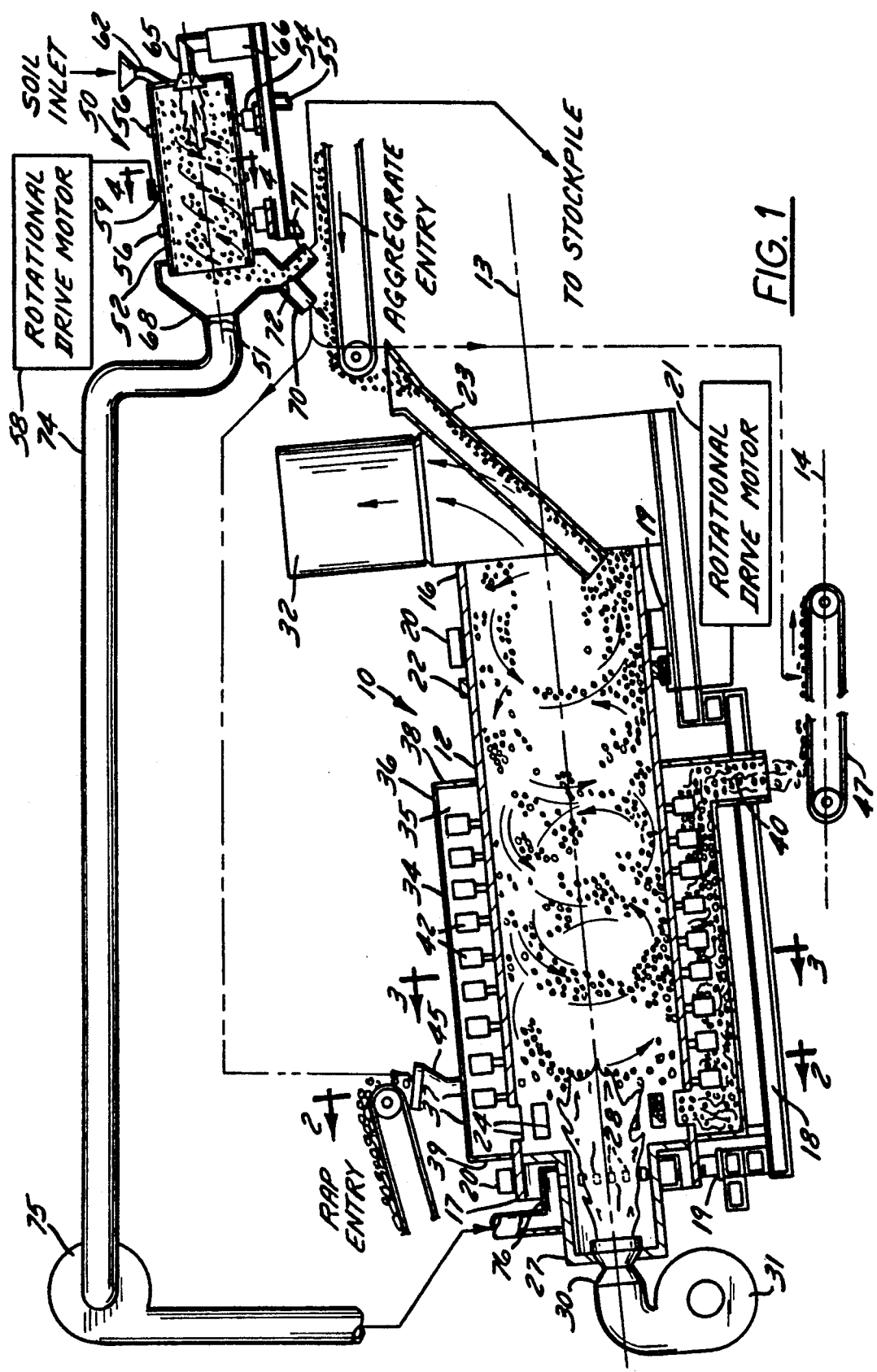
FIG. 1 is a schematic side elevation view of an apparatus which embodies the features of the present invention.

Referring more particularly to the drawings, FIG. 1 illustrates a drum mixer 10 in accordance with one preferred embodiment of the present invention. The mixer comprises an elongate hollow drum 12 defining a central axis 13, and the drum is mounted for rotation about the central axis and with the central axis being inclined with respect the horizontal 14 so as to define an upper end 16 and a lower end 17 of the drum.

The drum 12 is rotatably mounted on a frame 18 by means of bearings 19 mounted to the frame and which engage races 20 which are mounted about the circumference of the drum. A motor as shown schematically at 21 engages an encircling gear ring 22 and rotatably drives the drum in a conventional manner. An aggregate inlet chute 23 is positioned adjacent the upper end of the drum for introducing stone aggregate or the like into the interior of the drum, and the inlet chute 23 is preferably provided with an air sealing flop gate (not shown) of conventional design. Also, a plurality of outlet openings 24 are formed about the periphery of the drum adjacent the lower end thereof for withdrawing aggregate from the interior of the drum in the manner further described below.

A plurality of flights or vanes 26 (FIGS. 2 and 3) are mounted on the inside of the drum 12, for lifting the aggregate and dropping the same through the interior of the drum as it is rotated. As indicated in FIGS. 2 and 3, the flights 26 may be of different configurations in different portions of the drum, as is conventional. Thus the aggregate which is introduced into the drum via the inlet chute 23 is caused to cascade through the interior of the drum, and move toward the outlet openings 24.

The drum mixer 10 further includes a hollow cylindrical combustion chamber 27 which is mounted coaxially about the central axis 13 so as to be partially received in the lower end of the drum. The combustion chamber is lined with a refractory material and it is fixedly mounted so as to not rotate with the drum. The combustion chamber also includes an annular ring of openings 28 extending radially through the wall of the chamber for the purpose described below. A burner 30 is mounted at the lower end of the combustion chamber for directing a high temperature flame into the interior of the combustion chamber 27 and then into the drum 12. The burner 30 is of conventional design, and it preferably comprises a blower 31 which charges a mixture of fuel and air into the burner, where it is ignited to produce a flame for heating the interior of the combustion chamber 27. An exhaust duct 32 is positioned at the upper end 16 of the drum, which may include an exhaust fan (not shown) for exhausting the heated gas from the drum and so that the heated gas flows through the drum to heat the cascading aggregate. The exhaust air flow may then be ducted to a conventional filtering baghouse or other dust collector, before it is released to the atmosphere.

The drum mixer 10 further comprises a fixed sleeve 34 which is mounted coaxially about a portion of the length of the drum 12 adjacent the lower end 17 thereof, and so that the drum and sleeve define an annular chamber 35 therebetween. The sleeve 34 is thus similarly inclined to the horizontal 14, so as to define an upper end 36 and a lower end 37. The sleeve also includes annular shoulders 38, 39 at each end thereof to close the annular chamber 35 between the drum and the sleeve, and the lower end 37 of the sleeve 35 overlies the outlet openings 24 of the drum 12 so that the outlet openings 24 open into the annular chamber 35. Thus the heated and dried aggregate in the lower end of the drum falls into the annular chamber during rotation of the drum. The sleeve 34 further includes a discharge opening 40 adjacent the upper end thereof, which preferably also includes an air sealing flop gate (not shown).

A plurality of paddle like flights or mixing blades 42 are mounted on the outer circumference of the drum 12 along the portion of the drum received within the sleeve. The blades 42 are configured and angled such that as the blades traverse the annular chamber 35, they thereby engage the aggregate in the annular chamber and move the aggregate toward the discharge opening 40 of the sleeve, while causing the aggregate to be mixed.

A liquid asphalt supply pipe 44 (FIG. 3) communicates with the annular chamber 35 for introducing liquid asphalt into the chamber so as to be mixed with the aggregate therein. Further, an inlet 45 positioned adjacent the lower end of the sleeve permits an additive, such as recycle asphalt pavement (RAP), to be introduced into the annular chamber 35 and so as to be mixed with the aggregate and the liquid asphalt therein. The inlet 45 includes an air sealing flop gate 46 as seen in FIG. 2. The resulting asphalt paving composition is discharged through the discharge opening 40 of the sleeve and onto an advancing conveyor 47 or some other means of conveyance. In the illustrated embodiment, a further inlet 48 is provided intermediate the length of the sleeve 34 for permitting another additive, such as lime, to be introduced into the annular chamber, and so as to be mixed with the other materials in the chamber.

The drum mixer 10 as described above is further illustrated and described in U.S. Pat. No. 4,867,572 to Brock, the disclosure of which is expressly incorporated by reference. Also, while the illustrated embodiment of the drum mixer 10 is of the counterflow type, a mixer of the parallel flow type as illustrated for example in U.S. Pat. No. 4,211,490 could be used.

In accordance with the present invention, the apparatus further comprises a rotary incinerator 50 which is positioned adjacent the drum mixer 10 and is mounted for rotation about a rotational axis 51 which is inclined with respect to the horizontal 14. The rotary incinerator 50 comprises a hollow drum 52 which is composed of a cylindrical wall 53 having a refractory lining, and the drum 52 is mounted for rotation about the axis 51 by means of bearings 54 which are mounted on a support frame 55. The bearings 54 engage races 56 which are mounted about the circumference of the drum 52, and a motor 58 is provided which engages an encircling gear ring 59 to rotate the drum 52 about the axis 51. A soil inlet chute 62 is positioned adjacent the upper end of the incinerator 50 for introducing soil or the like into the interior of the drum 52. Further, a plurality of flights or vanes 63 (FIG. 4) are mounted on the inside surface of the refractory lining of the wall 53, for lifting the soil and causing the same to cascade through the interior of the drum and move toward its lower end as it is rotated.

The incinerator 50 further includes a burner 65 which is mounted adjacent the upper end of the drum 52 for directing a high temperature flame into the interior of the drum. The burner 65 is of conventional design, and it may include a blower 66 which charges a mixture of fuel and air into the burner, where it is ignited to produce a flame for heating the interior of the incinerator 50.

An outlet housing 68 communicates with the lower end of the drum 52 of the incinerator 50, such that the incinerated material is received therein from the incinerator. The lower portion of the housing 68 is divided into a first outlet passageway 70 and a second outlet passageway 71, and a diverter gate 72 is positioned in the housing 68 for selectively delivering the material discharged from the lower end of the drum 52 into a selected one of the passageways. The first passageway 70 preferably delivers the incinerated soil to the inlet 45, so that it may be delivered into the sleeve 35 with the RAP and then mixed with the heated aggregate. Alternatively, the passageway 70 may deliver the incinerated soil into the inlet chute 23 with the aggregate, or it may deliver the incinerated soil to the heated aggregate on the conveyor 47. The second passageway 71 preferably delivers the incinerated soil to a stockpile for separate use or disposal.

The apparatus of the present invention further includes an exhaust gas duct 74 for conveying the gaseous products of combustion from the incinerator 50 into the rotary drum 12. More particularly, the exhaust gas duct 74 communicates with the housing 68 and it includes a high temperature fan 75 for assisting the transport of the gaseous product. The duct 74 leads to a sleeve 76 which surrounds the combustion chamber 27 so as to communicate with the openings 28. Thus the gaseous products are conveyed from the incinerator 50 directly into the combustion chamber 27 where they are exposed to the high temperature generated by the flame of the burner 30. By this arrangement, any volatile hydrocarbons contained in the gaseous products of combustion from the incinerator 50 are further incinerated in the combustion chamber 27 of the burner 30, to thereby effectively prevent any harmful discharge to the atmosphere.

If necessary, provision may be made for diluting the gaseous products of combustion leaving the incinerator 50, to cool the gasses or keep them safely below the lower explosive limit. In this regard, the primary control means for staying below the lower explosive level is by controlling the contamination level in the material being processed in the incinerator 50 by blending it with uncontaminated soil. However, further control may be maintained by injecting air, steam, or an inert flue gas into the housing 68.

In the drawings and specification, there has been set forth a preferred embodiment of the invention, and although specific terms are employed, they are used in a generic and descriptive sense only and not for purposes of limitation.

That which is claimed is:

1. An apparatus for continuously heating and drying stone aggregate useful in the continuous production of asphalt paving composition or the like, and which is characterized by the ability to incinerate a second material such as contaminated soil and selectively add the incinerated second material to the heated aggregate, and comprising rotary drum means for heating and drying stone aggregate, and rotary incinerator means for incinerating a second material, and comprising a rotary incinerator, inlet means for introducing a second material into the interior of said incinerator, heating means for heating the interior of said incinerator, outlet means for withdrawing the incinerated second material from said incinerator and selectively (1) conveying the incinerated material from said incinerator so as to be mixed with the heated and dried aggregate produced by said rotary drum means or (2) delivering the incinerated second material to a separate location, and incinerator exhaust duct means for conveying the gaseous products of combustion from said incinerator into said rotary drum means.

2. The apparatus as defined in claim 1 wherein said rotary incinerator comprises a cylindrical wall having a refractory lining.

3. The apparatus as defined in claim 2 wherein said rotary incinerator further comprises a plurality of flights mounted to the interior of said refractory lining so as to lift and cascade the material passing therethrough during rotation of said incinerator.

4. The apparatus as defined in claim 3 wherein said cylindrical wall of said rotary incinerator defines a rotational axis which is inclined with respect to the horizontal so as to define an upper end and a lower end, and wherein said inlet means is located adjacent said upper end and said outlet means is located adjacent said lower end.

5. The apparatus as defined in claim 4 wherein said outlet means includes a housing communicating with said lower end of said incinerator and defining a first passageway and a separate second passageway, and diverter gate means positioned in said housing for selectively delivering any material discharged from said lower end of said incinerator into a selected one of said passageways.

6. The apparatus as defined in claim 1 wherein said rotary drum means includes a burner and an associated combustion chamber, and said incinerator exhaust duct means conveys the gaseous products of combustion into said combustion chamber.

7. An apparatus for continuously heating and drying stone aggregate useful in the continuous production of asphalt paving composition or the like, and which is characterized by the ability to incinerate a second material such as contaminated soil, and comprising rotary drum means for heating and drying stone aggregate, and comprising a rotatably mounted elongate hollow drum, drive means for rotating said drum, a combustion chamber mounted adjacent one end of said drum, and a burner positioned to heat the interior of said combustion chamber, and rotary incinerator means for incinerating a second material, and comprising a rotary incinerator, drive means for rotating said incinerator, inlet means for introducing a second material into the interior of said incinerator, heating means for heating the interior of said incinerator to a temperature which is sufficiently high to incinerate said second material, outlet means for withdrawing the incinerated second material from said incinerator, and incinerator exhaust duct means for conveying the gaseous products of combustion from said incinerator into said combustion chamber of said rotary drum means.

8. The apparatus as defined in claim 7 wherein said combustion chamber is fixedly mounted so as to not rotate with said drum.

9. The apparatus as defined in claim 8 wherein said outlet means of said rotary incinerator means comprises passageway means for selectively (1) conveying the incinerated material from said incinerator so as to be mixed with the heated and dried aggregate produced by said rotary drum means or (2) delivering the incinerated second material to a separate location.

10. An apparatus for continuously heating and drying stone aggregate useful in the continuous production of asphalt paving composition or the like, and which is characterized by the ability to incinerate a second material such as contaminated soil, and comprising an elongate hollow drum defining a central axis,
means mounting said drum for rotation about said central axis and with said central axis being inclined with respect to the horizontal so as to define an upper end and a lower end of said drum,
aggregate inlet means positioned adjacent said upper end of said drum for introducing aggregate into the interior of said drum while it is rotating about said central axis,
aggregate outlet means positioned adjacent said lower end of said drum for withdrawing the aggregate from the interior of said drum while it is rotating about said central axis,
means for rotating said drum about said central axis so as to cause the aggregate which is introduced at said inlet means to cascade through the interior of said drum and move to said outlet means,
drum heating means positioned adjacent one of the ends of said drum for introducing heated gas into the interior of said drum,
drum exhaust duct means positioned adjacent the other of said ends of said drum for exhausting the heated gas therefrom and so that the heated gas flows through said drum and through the cascading aggregate.
a rotary incinerator which is mounted for rotation about a rotational axis,
means for rotating said incinerator about said rotational axis,
incinerator inlet means for introducing a second material into the interior of said incinerator,
incinerator heating means for introducing heated gas into the interior of said incinerator said gas being of a sufficiently high temperature to incinerate said second material,
incinerator outlet means for withdrawing the second material from said incinerator, and
incinerator exhaust duct means for conveying the gaseous products of combustion from the interior of said incinerator into said drum at a location adjacent said drum heating means.

11. The apparatus as defined in claim 10 wherein said drum further comprises a fixed sleeve mounted coaxially about at least a portion of the length of said drum and so as to define an annular chamber between said drum and said sleeve, said sleeve having a lower end overlying said outlet means of said drum and an upper end positioned intermediate said ends of said drum, and with said outlet means of said drum opening into said annular chamber so as to receive the heated and dried aggregate therein, and with said sleeve further including a discharge opening adjacent said upper end thereof.

12. The apparatus as defined in claim 11 wherein said drum includes mixing vane means mounted to the exterior thereof and so as to be positioned within said annular chamber for mixing the aggregate received therein upon rotation of said drum and moving the aggregate toward said discharge opening of said sleeve.

13. The apparatus as defined in claim 12 further comprising means for introducing liquid asphalt or the like into said annular chamber so as to be mixed with the aggregate therein.

14. The apparatus as defined in claim 13 further comprising an entry port positioned adjacent said lower end of said sleeve for introducing a further material, such as recycle asphalt paving, into said annular chamber so as to be mixed with the aggregate and the liquid asphalt therein.

15. The apparatus as defined in claim 14 wherein said incinerator outlet means includes a housing communicating with said lower end of said incinerator and defining a first passageway and a separate second passageway, and diverter gate means positioned in said housing for selectively delivering any material discharged from said lower end of said incinerator into a selected one of said passageways.

16. The apparatus as defined in claim 15 wherein one of said passageways is positioned to direct the discharged material into said entry port.

17. The apparatus as defined in claim 10 wherein said rotary incinerator comprises a cylindrical wall having a refractory lining, and wherein said cylindrical wall defines a rotational axis which is inclined with respect to the horizontal so as to define an upper end and a lower end, and wherein said incinerator inlet means is located adjacent said upper end of said incinerator and said outlet means is located adjacent said lower end.

18. The apparatus as defined in claim 17 wherein said incinerator outlet means includes a housing communicating with said lower end of said incinerator and defining a first passageway and a separate second passageway, and diverter gate means positioned in said housing for selectively delivering any material discharged from said lower end of said incinerator into either one of said passageways.

19. The apparatus as defined in claim 10 wherein said drum heating means comprises a burner and an associated combustion chamber, and said incinerator exhaust duct means conveys the gaseous products of combustion into said combustion chamber.

* * * * *